(12) United States Patent
Takei

(10) Patent No.: US 6,269,084 B1
(45) Date of Patent: Jul. 31, 2001

(54) TIME DELAY BASED SOLUTION OF A TELECOMMUNICATION ROUTE

(75) Inventor: Katsuaki Takei, Tokyo (JP)

(73) Assignee: Oki Electric Industry Co., Ltd. (JP)

( * ) Notice: Subject to any disclaimer, the term of this patent is extended or adjusted under 35 U.S.C. 154(b) by 0 days.

(21) Appl. No.: 09/072,026

(22) Filed: May 5, 1998

(30) Foreign Application Priority Data

May 27, 1997 (JP) .................................... 9-152859

(51) Int. Cl.$^7$ ............................ H04L 12/26; G01R 31/08
(52) U.S. Cl. ..................... 370/248; 370/352; 370/353; 370/355; 370/357; 379/221
(58) Field of Search ..................... 370/351, 248, 370/254, 352, 353, 355, 357, 252; 379/220, 221; 455/428; 364/578

(56) References Cited

U.S. PATENT DOCUMENTS

| | | | |
|---|---|---|---|
| 4,488,288 | * 12/1984 | Turner ................................ | 370/60 |
| 4,506,358 | * 3/1985 | Montgomery ........................ | 370/60 |
| 4,551,833 | * 11/1985 | Turner ................................ | 370/60 |
| 4,741,027 | * 4/1988 | Maisel et al. ....................... | 379/221 |
| 5,450,394 | * 9/1995 | Gruber et al. ....................... | 370/17 |
| 5,548,581 | 8/1996 | Makrucki . | |
| 5,598,411 | 1/1997 | Matsukawa . | |
| 5,815,809 | * 9/1998 | Ward et al. ......................... | 455/428 |
| 5,878,032 | * 3/1999 | Mirek et al. ........................ | 370/252 |
| 5,883,819 | * 3/1999 | Abu-Amara et al. ............... | 364/578 |

FOREIGN PATENT DOCUMENTS

| | | |
|---|---|---|
| 0 750 440 A2 | 6/1996 | (EP) . |
| 62-150953 | 7/1987 | (JP) . |
| 63-180243 | 7/1988 | (JP) . |
| 2-73746 | 3/1990 | (JP) . |
| 7-221775 | 8/1995 | (JP) . |

OTHER PUBLICATIONS

"Dynamic Adjustment of Timer to Terminate Multicast Queries", IBM Technical Disclosure Bulletin, US, IBM Corp. New York, vol. 35 No. 1B, Jun. 1, 1992 pp. 400–401 (XP002134600).

* cited by examiner

Primary Examiner—Alpus H. Hsu
Assistant Examiner—Joe Logsdon
(74) Attorney, Agent, or Firm—Venable; Robert J. Frank; James R. Burdett

(57) ABSTRACT

Telecommunication is exchanged between first telecommunication equipment and second telecommunication equipment. A response monitoring packet is sent from the first telecommunication equipment towards the second telecommunication equipment during telecommunication exchange. A timer is activated in the first telecommunication equipment and a response packet is received from the second telecommunication equipment during telecommunication exchange. A response time, defined as a time length from a time at which the response monitoring packet is sent and a time at which the response packet is received, is calculated. The response time is compared to a threshold value, which is defined corresponding to a specific communication class. A telecommunication line connecting the first telecommunication equipment and the second telecommunication equipment is disconnected if the response time is in excess of the threshold value.

20 Claims, 6 Drawing Sheets

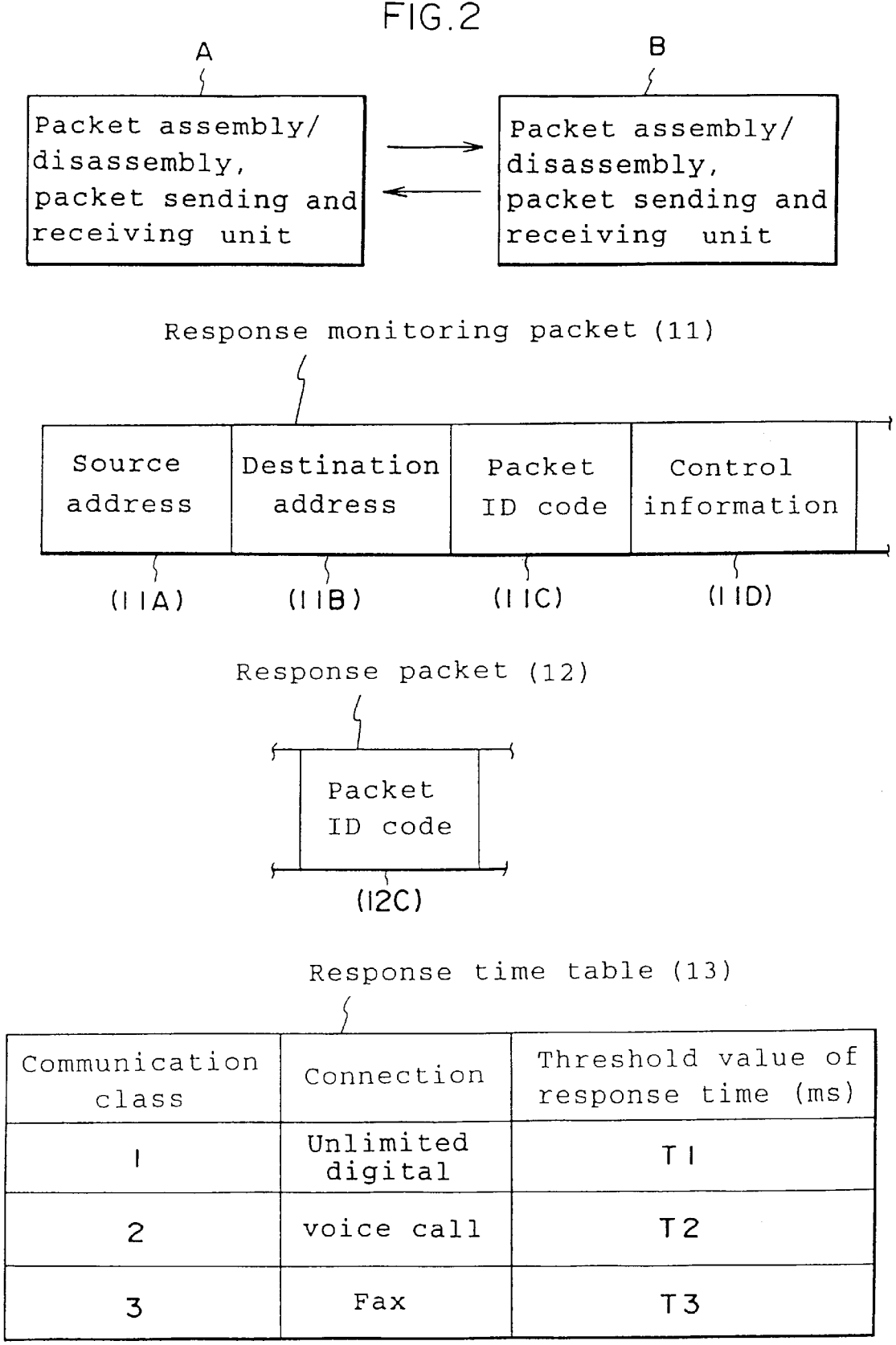

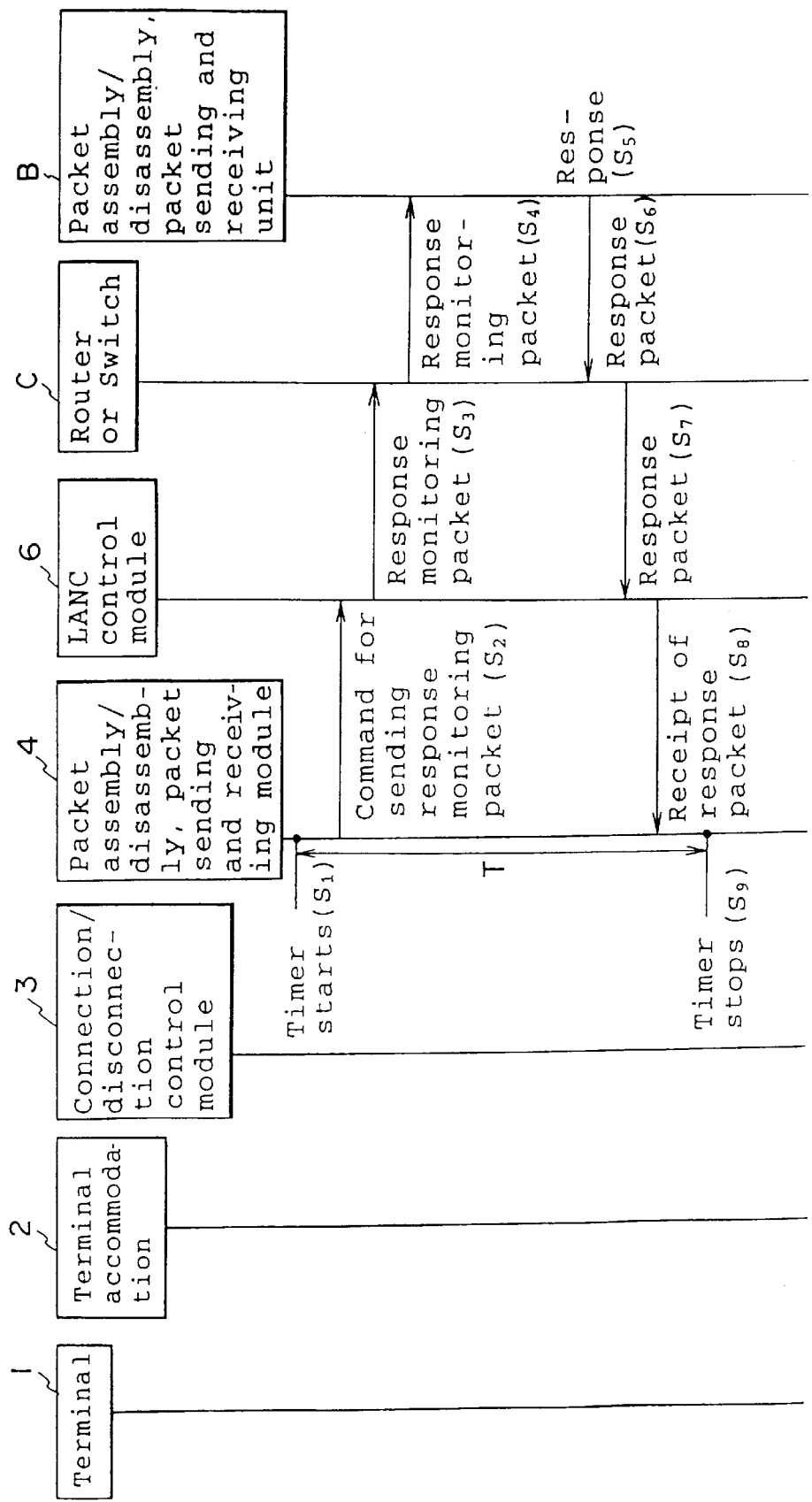

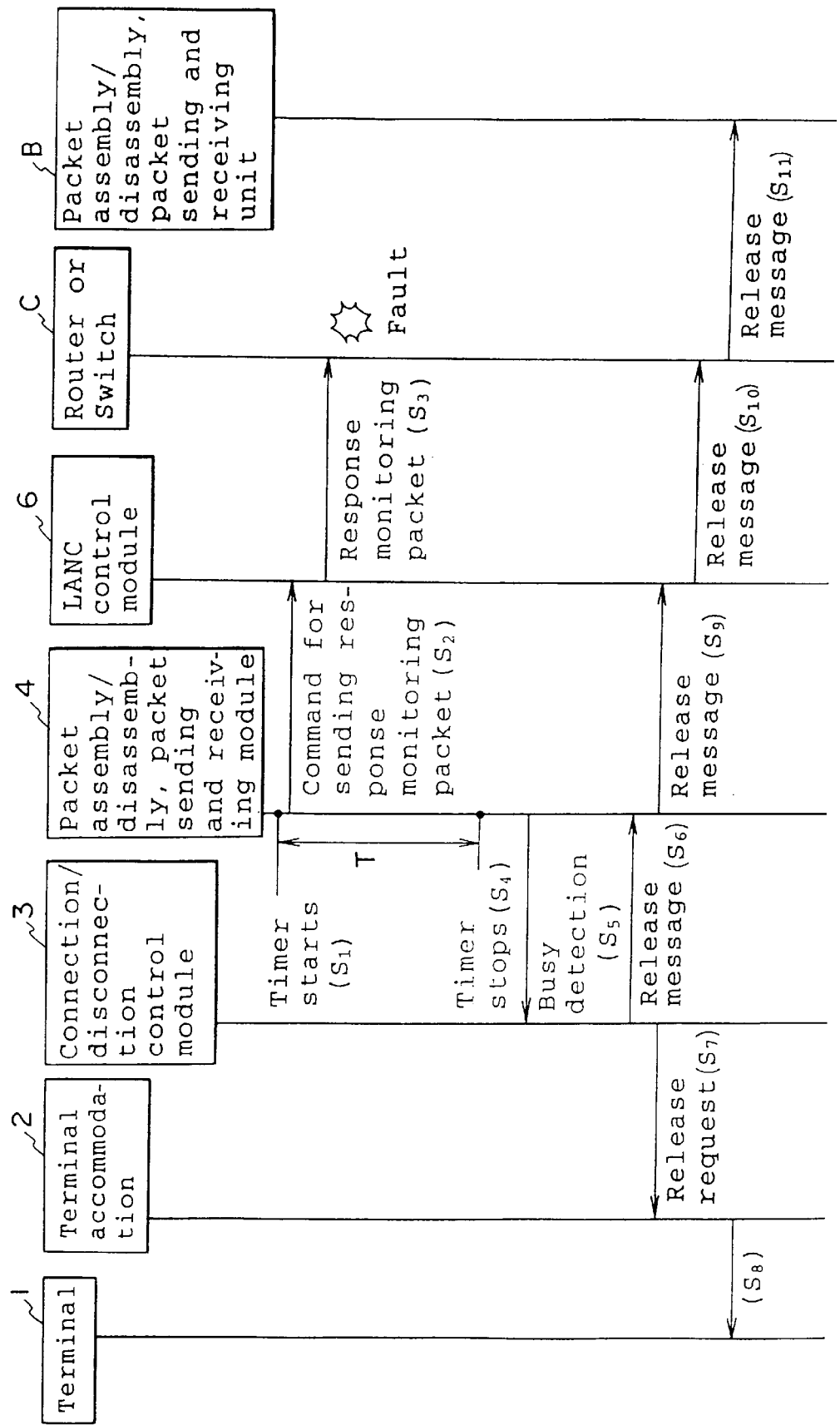

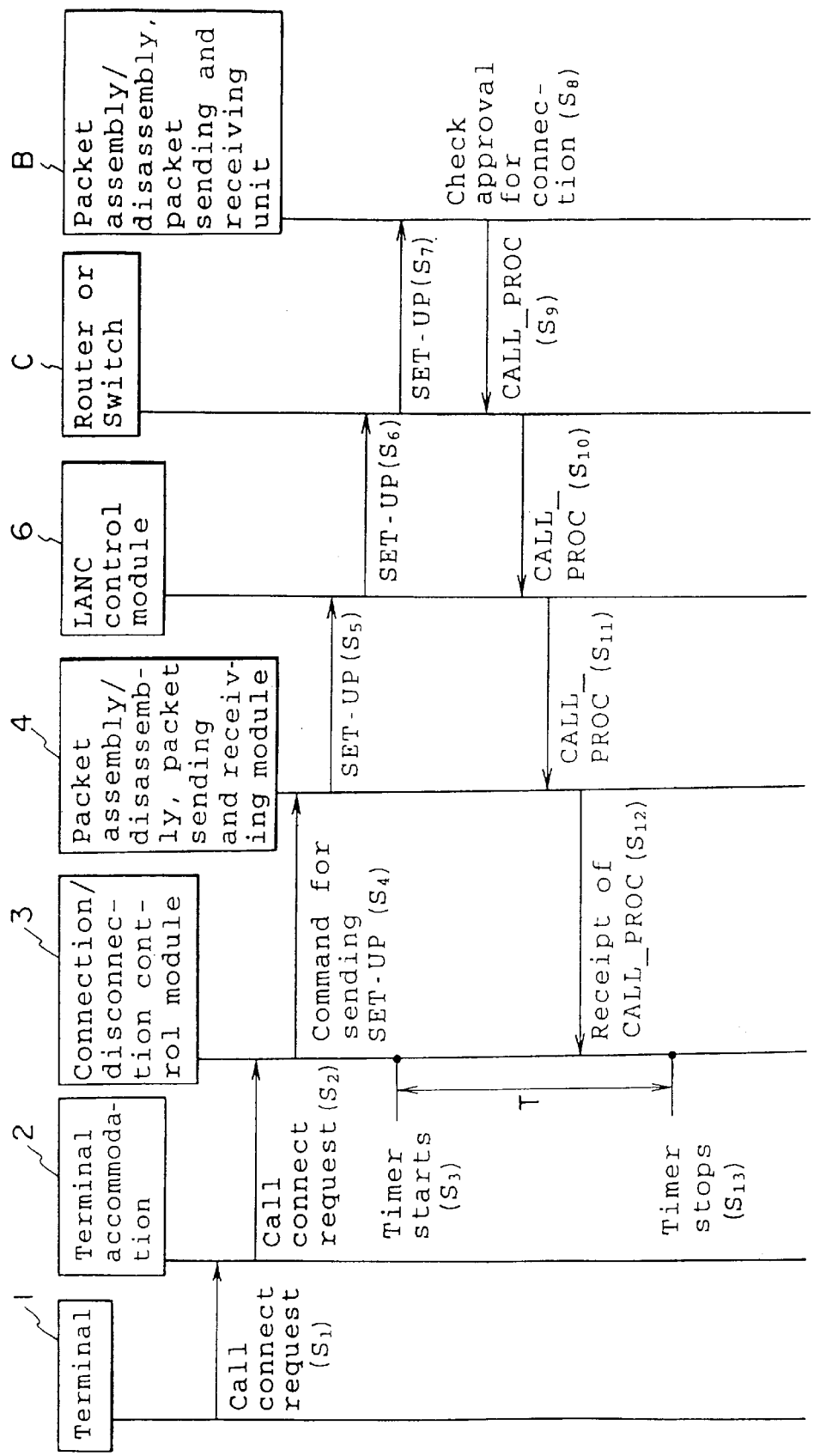

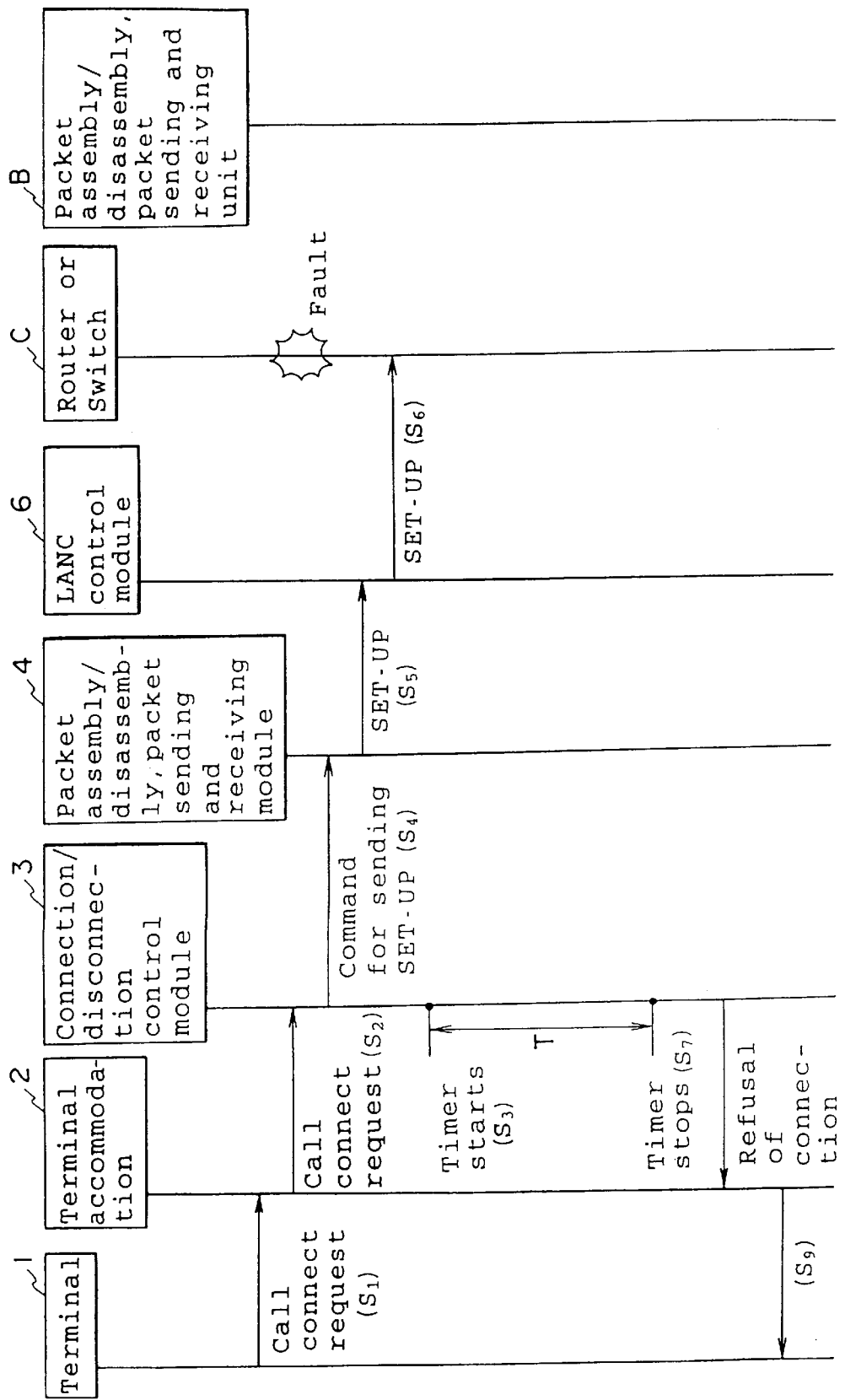

TIME DELAY BASED SOLUTION OF A TELECOMMUNICATION ROUTE

FIELD OF THE INVENTION

This invention relates to an improvement applicable to a method for managing connection/disconnection of a telecommunication line and to a management system employable for connection/disconnection of a telecommunication line. More specifically, this invention relates to an improvement developed for enabling real time monitoring of a telecommunication line.

BACKGROUND OF THE INVENTION

User Datagram Protocol set forth in RFC 768 is usually employed for an internet protocol network (IP network). In the User Datagram Protocol, however, no answer-back is available. In other words, a receiver does not return a confirmation signal to the sender.

In this sense, this system can have various drawbacks. Namely, none of the normal functions can be expected for telecommunication, when a telecommunication system is in disorder and/or when the telecommunication traffic is too busy and demand quantity is in excess of the system capacity. Under protocol which is not assisted by an answer-back system, neither a sender nor a receiver can identify whether or not the current telecommunication is proceeding, as is designed. Therefore, this system can not be employed for a type of telecommunication conducted on real time basis requiring a high grade of reliability. In this sense, this system can not be employed for voice call telecommunication or the like. Under such situations in which the system is in disorder or the traffic is too busy, normal operation can not be guaranteed for a system working based on the information sent by such a telecommunication system. If a request for connection is limitlessly accepted under a circumstance in which the telecommunication traffic is too busy, this enhances the too busy situation and delays recovery from the too busy situation. Further, since the line is kept connected until an abnormal situation is identified by either the sender or the receiver, even after the abnormal situation happens, a delay in recovery of the too busy situation causes a sizable amount of execution of useless telecommunication, wasting a sizable amount of money and materials and producing a sizable quantity of undelivered correspondence, resultantly devastating the reliability of telecommunication. In the foregoing sense, a telecommunication system in which the current position of telecommunication is not monitored on the real time basis, is accompanied by a considerable magnitude of drawbacks which include various parameters to devastate the reliability of the telecommunication system.

OBJECTS AND SUMMARY OF THE INVENTION

Accordingly, the object of this invention is to provide a telecommunication system in which a real time monitoring system is introduced therein.

To achieve the foregoing object, a method for managing connection/disconnection of a telecommunication line in accordance with a first embodiment of this invention comprises:
a step for sending a response monitoring packet via a network from a first telecommunication equipment toward a second telecommunication equipment with which telecommunication is exchanged,
a step for receiving a response packet from the second telecommunication equipment,
a step for calculating a response time defined as a time length from the time at which the response monitoring packet is sent and the time at which the response packet is received,
a step for comparing the response time and the threshold value of a response time to be determined corresponding to a specific communication class, and
a step for disconnecting the telecommunication line connecting the first telecommunication equipment and the second telecommunication equipment, in response to an excess of the response time over the threshold value of a response time defined corresponding to the specific communication class.

To achieve the foregoing object, a management system employable for connection/disconnection of a telecommunication line in accordance with a first embodiment of this invention comprises:
a packet assembly/disassembly, packet sending and packet receiving unit for sending a response monitoring packet via a network from a first telecommunication equipment toward a second telecommunication equipment with which telecommunication is exchanged and for receiving a response packet from the second telecommunication equipment,
a monitoring timer for monitoring a response time defined as a time length from the time at which the response monitoring packet is sent and the time at which the response packed is received,
a telecommunication control unit for comparing the response time and the threshold value of a response time to be determined corresponding to a specific communication class and for disconnecting the telecommunication line connecting the first telecommunication equipment and the second telecommunication equipment, in response to an excess of the response time over the threshold value of a response time defined corresponding to the specific communication class.

To achieve the foregoing object, a method for managing connection/disconnection of a telecommunication line in accordance with a second embodiment of this invention comprises:
a step for sending a call connect request requesting connection of a line connecting a first telecommunication equipment and a second telecommunication equipment, via a network, from the first telecommunication equipment toward the second telecommunication equipment,
a step for receiving a message confirming acceptance of the call connect request requesting connection of a line connecting the first telecommunication equipment and the second telecommunication equipment, from the second telecommunication equipment,
a step for calculating a response time defined as a time length from the time at which the message requesting connection of a line connecting the first telecommunication equipment and the second telecommunication equipment and the time at which the message confirming acceptance of the message requesting connection of a line connecting the first telecommunication equipment and the second telecommunication equipment, from the second telecommunication equipment,
a step for comparing the response time and the threshold value of a response time to be determined corresponding to a specific communication class, and
a step for forbearing connection of a line connecting the first telecommunication equipment and the second telecommunication equipment, in response to an excess of the response time over the threshold value of a response time defined corresponding to the specific communication class.

To achieve the foregoing object, a management system employable for connection/disconnection of a telecommunication line in accordance with a second embodiment of this invention comprises:

a means for sending a call connect request for requesting connection of a line connecting a first telecommunication equipment and a second telecommunication equipment, via a network, from the first telecommunication equipment toward the second telecommunication equipment and for receiving a message confirming acceptance of the call connect request for requesting connection of a line connecting the first telecommunication equipment and the second telecommunication equipment, from the second telecommunication equipment, a monitoring timer for monitoring a response time defined as a time length from the time at which the message requesting connection of a line connecting the first telecommunication equipment and the second telecommunication equipment and the time at which the message confirming acceptance of the call connect request for requesting connection of a line connecting the first telecommunication equipment and the second telecommunication equipment, and a telecommunication control unit for comparing the response time and the threshold value of a response time to be determined corresponding to a specific communication class and for forbearing connection of a line connecting the first telecommunication equipment and the second telecommunication equipment, in response to an excess of the response time over the threshold value of a response time defined corresponding to the specific communication class.

BRIEF DESCRIPTION OF THE DRAWINGS

This invention, together with its various features and advantages, can be readily understood from the following more detailed description presented in conjunction with the following drawings, in which:

FIG. 2 is a block diagram showing a method for managing connection/disconnection of a telecommunication line in accordance with a first embodiment of this invention, FIG. 3 is a sequence chart showing a method for managing connection/disconnection of a telecommunication line in accordance with a first embodiment of this invention, the sequence chart showing the process in normal conditions, FIG. 4 is a sequence chart showing a method for managing connection/disconnection of a telecommunication line in accordance with a first embodiment of this invention, the sequence chart showing the process in abnormal conditions, FIG. 5 is a sequence chart showing a method for managing connection/disconnection of a telecommunication line in accordance with a second embodiment of this invention, the sequence chart showing the process in normal conditions, and FIG. 6 is a sequence chart showing a method for managing connection/disconnection of a telecommunication line in accordance with a second embodiment of this invention, the sequence chart showing the process in abnormal conditions.

DETAILED DESCRIPTION OF THE PREFERRED EMBODIMENTS OF THIS INVENTION

First Embodiment

Figure 1:
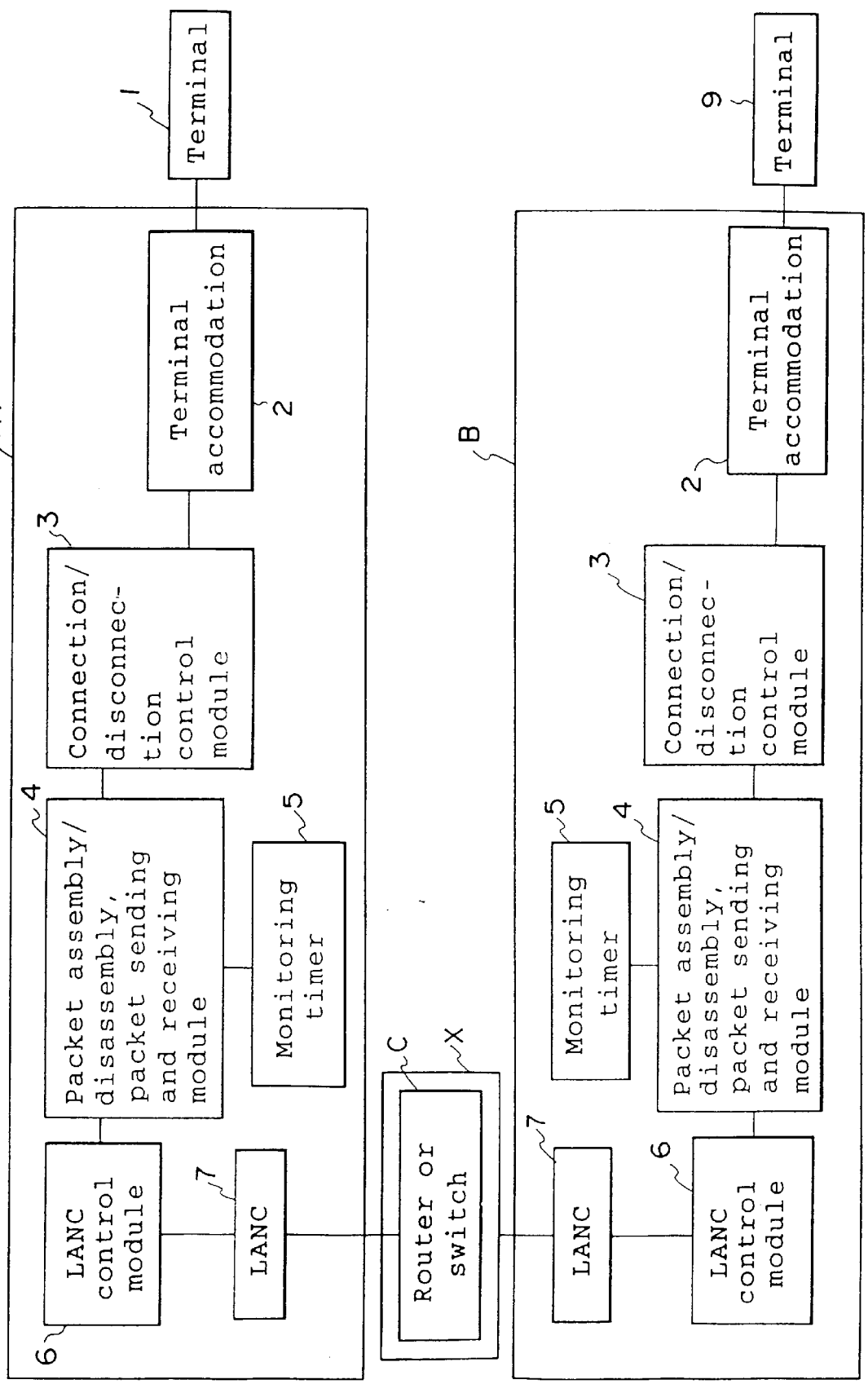
FIG. 1 is a block diagram of a management system employable for connection/disconnection of a telecommunication line in accordance with a first embodiment of this invention.

A management system employable for connection/disconnection of a telecommunication line and a method for managing connection/disconnection of a telecommunication line, is provided. In this embodiment a response monitoring packet is issued with regular intervals and a response packet for responding to the response monitoring packet is received. A monitoring timer is employed to define a threshold value for a response. The response time is defined as a time period between the time at which the response monitoring packet is sent and the time at which a response packet is issued in reply to the response monitoring packet is received. A comparison of the response time and the threshold value for a response time for a specific telecommunication class is made and a decision to discontinue the current telecommunication, in response to an excess of the response time over the threshold value of a response time determined corresponding to a specific communication class, is made.

Referring to FIG. 1, a management system employable for connection/disconnection of a telecommunication line in accordance with the first embodiment of this invention will be described below. A packet assembly/disassembly, packet sending and packet receiving unit for sending a response monitoring packet via a network from a first telecommunication equipment toward a second telecommunication equipment with which telecommunication is exchanged and for receiving a response packet from the second telecommunication equipment (A) is composed of a terminal (1), a terminal accommodation (2), a connection/disconnection control module (3), a packet assembly/disassembly, packet sending and packet receiving module (4), a monitoring timer (5), a LANC control module (6) and a LANC (local area network controller) (7). The packet assembly/disassembly, packet sending and packet receiving unit for sending a response monitoring packet via a network from a first telecommunication equipment toward a second telecommunication equipment with which telecommunication is exchanged and for receiving a response packet from the second telecommunication equipment (A) is designed to exchange telecommunication with the other packet assembly/disassembly, packet sending and packet receiving unit for sending a response monitoring packet via a network from a second telecommunication equipment toward a first telecommunication equipment with which telecommunication is exchanged and for receiving a response packet from the first telecommunication equipment (B) via an IP network (X) which contains an arbitrary quantity of routers or switches (C), which connects the packet assembly/disassembly, packet sending and packet receiving unit for sending a response monitoring packet via a network from a second telecommunication equipment toward a first telecommunication equipment with which telecommunication is exchanged and for receiving a response packet from the second telecommunication equipment (A) and the packet assembly/disassembly, packet sending and packet receiving unit for sending a response monitoring packet via a network from a second telecommunication equipment toward a first telecommunication equipment with which telecommunication is exchanged and for receiving a response packet from the first telecommunication equipment (B). The telecommunication is conducted based on IP protocol.

The terminal accommodation (2) is an interface for accommodating-the terminal (1) for the packet assembly/disassembly, packet sending and packet receiving unit (A) or an interface for accommodating the terminal (9) for the packet assembly/disassembly, packet sending and packet receiving unit (B). The connection/disconnection control module (3) controls telecommunication exchanged between the packet assembly/disassembly, packet sending and packet receiving unit for sending a response monitoring packet via a network from a first telecommunication equipment toward a second telecommunication equipment with which telecommunication is exchanged and for receiving a response packet from the second telecommunication equipment (A) and the packet assembly/disassembly, packet sending and packet receiving unit for sending a response monitoring packet via a network from a second telecommunication equipment toward a first telecommunication equipment with which telecommunication is exchanged and for receiving a response packet from the first telecommunication equipment (B). The packet assembly/disassembly, packet sending and packet receiving module (4) has a function for composing an IP packet out of a given piece of data and for sending the same via the LANC control module (6) and for receiving the other IP packet via the LANC control module (6) and for decomposing the other IP packet into the other piece of data and forwarding the other piece of data toward the connection/disconnection control module (3).

The monitor timer (5) has a function to calculate a response time. The response time can be defined as a period between the time at which a response monitoring packet is sent and the time at which the corresponding response packet is received. The monitor timer (5) forwards the response time to the connection/disconnection control module (3) via the packet assembly/disassembly, packet sending and packet receiving module (4). The LANC control module (6) has a function to regulate the LANC (7) to send and receive the packet.

Referring to FIG. 2, a method for managing connection/disconnection of a telecommunication line in accordance with the first embodiment of this invention will be described below. A packet assembly/disassembly, packet sending and packet receiving unit for sending a response monitoring packet via a network from a first telecommunication equipment toward a second telecommunication equipment with which telecommunication is exchanged and for receiving a response packet from the second telecommunication equipment (A) is supposed to be connected the other packet assembly/disassembly, packet sending and packet receiving unit for sending a response monitoring packet via a network from a second telecommunication equipment toward a first telecommunication equipment with which telecommunication is exchanged and for receiving a response packet from the first telecommunication equipment (B). For example, the packet assembly/disassembly, packet sending and packet receiving unit for sending a response monitoring packet via a network from a first telecommunication equipment toward a second telecommunication equipment with which telecommunication is exchanged and for receiving a response packet from the second telecommunication equipment (A) and the packet assembly/disassembly, packet sending and packet receiving unit for sending a response monitoring packet via a network from a second telecommunication equipment toward a first telecommunication equipment with which telecommunication is exchanged, and for receiving a response packet from the first telecommunication equipment (B) are assumed to be exchanging, on a real time basis, telecommunication in which reliability is important. The packet assembly/disassembly, packet sending and packet receiving unit for sending a response monitoring packet via a network from a first telecommunication equipment toward a second telecommunication equipment with which telecommunication is exchanged and for receiving a response packet from the second telecommunication equipment (A) sends response monitoring packets (11) with regular intervals. The response monitoring packet (11) contains a source address (11A), a destination address (11B), a packet ID code (11C) and a piece of control information (11D) et al. The packet ID code (11C) is a unique code produced simultaneously with a packet.

The response monitoring packet requires the packet assembly/disassembly, packet (11) sending and packet receiving unit for sending a response monitoring packet via a network from a second telecommunication equipment toward a first telecommunication equipment with which telecommunication is exchanged and for receiving a response packet from the first telecommunication equipment (B) to return a response packet (12). When receiving a response monitoring packet (11), the packet assembly/disassembly, packet sending and packet receiving unit for sending a response monitoring packet via a network from a second telecommunication equipment toward a first telecommunication equipment with which telecommunication is exchanged and for receiving a response packet from the first telecommunication equipment (B) returns the sender packet assembly/disassembly, packet sending and packet receiving unit for sending a response monitoring packet via a network from a first telecommunication equipment toward a second telecommunication equipment with which telecommunication is exchanged and for receiving a response packet from the second telecommunication equipment (A) a response packet (12) containing a packet ID code (12A) contained in the corresponding response monitoring packet. The packet ID code (11C) is employed to identify the response packet (12). When receiving a response packet (12), the sender packet assembly/disassembly, packet sending and packet receiving unit for sending a response monitoring packet via a network from a first telecommunication equipment toward a second telecommunication equipment with which telecommunication is exchanged and for receiving a response packet from the second telecommunication equipment (A) employs the monitoring timer which can be (5) to calculate a response time defined as the period between the time at which a response monitoring packet (11) is sent and the time at which the corresponding response packet (12) is received. The packet assembly/disassembly, packet sending and packet receiving module (4) illustrated in FIG. 1 has a response time table (13) containing the communication class, the connection (the nature of the specific connection) and the threshold value of the corresponding response time, an example of which is shown in a table contained in FIG. 2.

The response time table (13) exemplified in FIG. 2 contains three communication classes (1), (2) and (3). The communication class (1) is involved with unlimited or unconditional digital telecommunication which does not necessarily require communication conducted on the real time basis. Thus, a long time ($T_1$) is selected as a threshold value of a response time for the communication class (1). In the case where a specific piece of communication is involved with the voice call communication as shown in communication, class (2), a medium length of time ($T_2$) which is long enough to maintain the transmission quality required, is selected as the threshold value for the communication class. When it comes to fax transmission as shown in the communication class (3), a short time ($T_3$) which is short enough-to allow fax transmission, is selected as the threshold value for the communication class.

In response to an excess of a response time over the corresponding threshold value, and the telecommunication line is discontinued and the telecommunication is interrupted.

Referring to FIG. 3, sequential steps will be described for the normal case in accordance with the first embodiment of this invention.

Firstly, it is supposed that the packet assembly/disassembly, packet sending and packet receiving units for sending a response monitoring packet via a network from a first telecommunication equipment toward a second telecommunication equipment with which telecommunication is exchanged and for receiving a response packet from the second telecommunication equipment (A) and the packet assembly/disassembly, packet sending and packet receiving units for sending a response monitoring packet via a network from a second telecommunication equipment toward a first telecommunication equipment with which telecommunication is exchanged and for receiving a response packet from the first telecommunication equipment (B) are connected to each other. Secondly, a monitoring timer (5) starts counting time S (Step $S_1$). The threshold value of a response time differs depending on the telecommunication class. Referring to a response time table (13), a threshold value of a response time is selected to be set on the monitoring timer (5). As a result, the monitoring timer (5) is scheduled to stop counting time, when the set period expires. Thirdly, a command for sending a response monitoring packet is given to the LANC control module (6) (Step $S_2$), which sends a response monitoring packet to a packet assembly/disassembly, packet sending and packet receiving unit for sending a response monitoring packet via a network from a second telecommunication equipment toward a first telecommunication equipment with which telecommunication is exchanged and for receiving a response packet from the first telecommunication equipment (B) via the router or the switch (C) (Steps $S_3$ and $S_4$). Receiving the response monitoring packet, the packet assembly/disassembly, packet sending and packet receiving unit for sending a response monitoring packet via a network from a second telecommunication equipment toward a first telecommunication equipment with which telecommunication is exchanged and for receiving a response packet from the first telecommunication equipment (B) composes a response packet and sends the same to the router or the switch (C), which forwards the same to the packet assembly/disassembly, packet sending and packet receiving unit for sending a response monitoring packet via a network from a first telecommunication equipment toward a second telecommunication equipment with which telecommunication is exchanged and for receiving a response packet from the second telecommunication equipment (A) (Steps $S_6$ and $S_7$).

Receiving the response packet, the LANC control module (6) of the a packet assembly/disassembly, packet sending and packet receiving unit for sending a response monitoring packet via a network from a first telecommunication equipment toward a second telecommunication equipment with which telecommunication is exchanged and for receiving a response packet from the second telecommunication equipment (A) informs the packet assembly/disassembly, packet sending and packet receiving module (4) of the receipt of the response packet (Step 6). If the monitoring timer (5) is still counting time, the packet assembly/disassembly, packet sending and packet receiving module (4) stops the monitoring timer (5) counting time (Step $S_9$) and the telecommunication stays in the continued position. In other words, if the response time is shorter than the corresponding threshold value of a response time shown in the table (13) of FIG. 2, the telecommunication is allowed to go on. The foregoing response monitoring packet is sent out with regular intervals, during the period in which telecommunication is exchanged.

Referring to FIG. 4, sequential steps will be described for the abnormal case in accordance with the first embodiment of this invention. The abnormal case means cases in which a telecommunication line is in disorder and/or the telecommunication traffic is too busy.

Firstly, it is supposed that the packet assembly/disassembly, packet sending and packet receiving units for sending a response monitoring packet via a network from a first telecommunication equipment toward a second telecommunication equipment with which telecommunication is exchanged and for receiving a response packet from the second telecommunication equipment (A) and the packet assembly/disassembly, packet sending and packet receiving units for sending a response monitoring packet via a network from a second telecommunication equipment toward a first telecommunication equipment with which telecommunication is exchanged and for receiving a response packet from the first telecommunication equipment (B) are connected to each other. Secondly, a monitoring timer (5) starts counting time S (Step $S_1$). Thirdly, a command for sending a response monitoring packet is given to the LANC control module (6) (Step $S_2$), which tries to send a response monitoring packet to the packet assembly/disassembly, packet sending and packet receiving unit for sending a response monitoring packet via a network from a second telecommunication equipment toward a first telecommunication equipment with which telecommunication is exchanged and for receiving a response packet from the first telecommunication equipment (B) via the router or the switch (C) (Step $S_3$). Since the router or the switch (C) and/or the corresponding connection do not work as are described, however, the response monitoring packet does not reach the packet assembly/disassembly, packet sending and packet receiving unit for sending a response monitoring packet via a network from a second telecommunication equipment toward a first telecommunication equipment with which telecommunication is exchanged and for receiving a response packet from the first telecommunication equipment (B).

As soon as the monitoring timer (5) finishes counting time, the packet assembly/disassembly, packet sending and packet receiving module (4) informs the connection/disconnection control module (3) of the non-delivery of the response monitoring packet at the packet assembly/disassembly, packet sending and packet receiving unit for sending a response monitoring packet via a network from a second telecommunication equipment toward a first telecommunication equipment with which telecommunication is exchanged and for receiving a response packet from the first telecommunication equipment (B) (Steps $S_4$ and $S_5$). This that the router or the switch (C) and the relevant line are not in a condition ready to continue the telecommunication presently ongoing. Receiving this information, the connection/disconnection control module (3) issues a release request or a command for disconnection of the line (Step $S_7$ and $S_8$).

On the other hand, a release message is issued to the packet assembly/disassembly, packet sending and packet receiving unit for sending a response monitoring packet via a network from a second telecommunication equipment toward a first telecommunication equipment with which telecommunication is exchanged and for receiving a response packet from the first telecommunication equipment (B) as well to release the connection (Steps $S_6$, $S_9$, $S_{10}$ and $S_{11}$). In this manner, the packet assembly/disassembly, packet sending and packet receiving unit for sending a response monitoring packet via a network from a second telecommunication equipment toward a first telecommunication equipment with which telecommunication is exchanged and for receiving a response packet from the first telecommunication equipment (B) disconnects the terminal (9).

In this manner, a response monitoring packet is sequentially sent out with regular intervals, so that a useless connection staying connected for a long time is effectively prevented.

If this type of a response monitoring packet is sent out with regular intervals during a telecommunication period, a needless connection is prevented from being maintained in vain for a long time.

Second Embodiment

A management system employable for connection/disconnection of a telecommunication line and a method for managing connection/disconnection of a telecommunication line, is provided. In this embodiment a call connect request for requesting connection of lines is issued prior to initiating a piece of telecommunication and a message confirming acceptance of the call connect request for requesting connection of lines is received. A monitoring timer is employed to define a threshold value for a response time defined as a time period between the time at which the message requesting connection of lines is sent and the time at which a message accepting the request issued in reply to the message requesting connection of lines is received. A comparison of the response time and the threshold value for a response time defined for a specific telecommunication class is made and decision to forbear establishment of the requested connection to implement the requested telecommunication, in response to an excess of the response time over the threshold value of a response time determined corresponding to a specific communication class, is made.

In the foregoing embodiment, a packet for monitoring response is issued with an appropriate interval after connection is established, to monitor the current position of the communication and whether or not the response time is satisfactory for a specific class of the transmission, whereby endurance of a useless connection is effectively prevented. A similar system is necessary, however, for a case in which a connection is scheduled to be made to initiate telecommunication. In other words, in the case where real time characteristics are required for a connection to be established for initiating telecommunication, it is preferable to make sure the telecommunication way is prepared to accept such requirement for conducting the telecommunication and to forbear initiation of telecommunication, if a normal function and communication speed can not be expected for a specific system.

This second embodiment is to achieve this object.

The schematic structure of a telecommunication system employable for this second embodiment is similar to that which is shown in FIG. 1. In this second embodiment, however, the step for sending a response monitoring packet is replaced by a step for sending a SET-UP message or a message requesting connection of a line connecting a first telecommunication equipment and a second telecommunication equipment. Also the step for receiving a response package from the second telecommunication equipment, a step for comparing a response time and the threshold value of a response time corresponding to a specific communication class, the step being conducted for the purpose to monitor the transmission way is in order, is replaced by a step for receiving a CALL_PROC message or a message confirming acceptance of the message requesting connection of a line connecting a first telecommunication unit (A) and a second telecommunication unit (B), a step for comparing a response time and a threshold value of a response time corresponding to a specific communication class, the step being conducted for the purpose to monitor the transmission way is in order.

Referring to FIG. 5, a series of sequential steps will be described for a case in which the transmission way normally functions.

Firstly, a call connect request for requesting connection with a terminal (9) is issued by a terminal (1) toward a connection/disconnection control module (3) via a terminal accommodation (2) (Steps $S_1$ and $S_2$). A monitoring timer (5) starts counting, after a threshold value is set a response time corresponding to a specific telecommunication class (Step $S_3$). A connection/disconnection control module (3) sends a SET-UP message or a message requesting connection of a line connecting a first telecommunication equipment and a second telecommunication equipment, via a packet composing, reading and receiving module (4) and a LANC control module (6) (Steps $S_4$ and $S_5$). This SET-UP message arrives at a packet assembly/disassembly, packet sending and packet receiving unit (B) via a router or a switch (C) (Steps $S_6$ and $S_7$).

The packet assembly/disassembly, packet sending and packet receiving unit (B) examines the content of the SET-UP massage or a message requesting connection of a line connecting a first telecommunication equipment (A) and a second telecommunication equipment (B). If it determines that connection is possible, it composes a CALL_PROC message or a message confirming its acceptance of the call connect request requesting connection of a line connecting a first telecommunication equipment (A) and a second telecommunication equipment (B) (Step $S_8$). This message is sent toward the packet assembly/disassembly, packet sending and packet receiving unit for sending a response monitoring packet via a network from a first telecommunication equipment toward a second telecommunication equipment with which telecommunication is exchanged and for receiving a response packet from the second telecommunication equipment (A) via the routes or the switch (C) (Step $S_9$ and $S_{10}$). When receiving the message confirming its acceptance of the message requesting connection of a line connecting a first telecommunication equipment and a second telecommunication equipment, the packet assembly/disassembly, packet sending and packet receiving unit for sending a response monitoring packet via a network from a first telecommunication equipment toward a second telecommunication equipment with which telecommunication is exchanged and for receiving a response packet from the second telecommunication equipments (A) causes the LANC control module (6) to inform of its receipt of the message to the connection/disconnection control module (3) via the packet assembly/disassembly, packet sending and packet receiving module (4) (Steps $S_{11}$ and $S_{12}$). Provided a response time is less than the threshold value of the response time for a specific telecommunication, the monitoring timer (5) terminates operation (Step $S_{13}$) and it is determined that the function of the transmission way is normal. As a result, connection will be implemented, as requested.

Referring to FIG. 6, a series of sequential steps will be described for a case in which the transmission way does not normally function, due to the disorder or too busy position.

Firstly, a call connect request is issued by a terminal (1) via a terminal accommodation (2) toward a connection/ disconnection control module (3) (Steps S$_1$ and S$_2$). A monitoring timer (5) starts counting (Step S$_3$). A connection/disconnection control module (3) sends a SET-UP message or a message requesting connection of a line connecting a first telecommunication equipment (A) and a second telecommunication equipment (B) via a packet assembly/disassembly, packet sending and packet receiving module (4) and a LANC control module (6) (Steps S$_4$ and S$_5$). The SET-UP message is sent by the LANC control module (6) via the router or the switch (C) (Step S$_6$).

Provided either the routers or switches (C) or the network is in disorder, the SET-UP message never arrives at the expected packet assembly/disassembly, packet sending and packet receiving unit for sending a response monitoring packet via a network from a second telecommunication equipment (A) toward a first telecommunication equipment (B) with which telecommunication is exchanged and for receiving a response packet from the first telecommunication equipments (B). The monitoring timer (5) quits operation after counting the scheduled period (Step S$_7$).

Being informed of the current position, the connection/disconnection control module (3) sends a message advising that the call connect request, a request for connection is refused, toward the terminal (1) via the terminal accommodation (2) (Steps S$_8$ and S$_9$). Since the connection/disconnection control module (3) has a function to forbear establishment of connection in the foregoing manner, a useless connection can be avoided. In addition, a useless employment of a telecommunication system can be refrained. Further, a period for recovery of a telecommunication system from a too busy position is sizably reduced.

The foregoing description has clarified that two independent methods for managing connection/disconnection of telecommunication lines and two independent management systems employable for connection/disconnection of telecommunication lines, are successfully provided by this invention.

Although this invention has been described with reference to specific embodiments, which is based on a concept that a response monitoring packet is issued with regular intervals, a response packet is received for the first embodiment, or a call connect request, a request for issuing a message requesting connection of lines or a SET-UP message is issued, a message confirming acceptance of the call connect request, a request for issuing a message requesting connection of lines or a CALL_PROC message is received prior to sending a piece of telecommunication for the second embodiment, a monitoring timer is employed to define a threshold value for a response time defined as a time period between the time at which the response monitoring packet or the message requesting connection of lines (a SET-UP message) is sent and the time at which a response packet or a message accepting the connection of lines (a CALL_PROC massage) is received, comparison of the response time and the threshold value for the response time defined for a specific telecommunication class is made, and decision to discontinue the telecommunication for the first embodiment or to forbear establishment of the requested connection is made for the second embodiment, in response to an excess of the response time over the threshold value of a response time corresponding to a specific communication class, this description is not meant to be construed in a limiting sense. In other words, the structure of a response monitoring packet and/or of a response packet can be of free in format as long as it has a function to issue a message asking the position of a transmission line and to receive a message replying to the original message. A monitoring timer is allowed to be housed in any module. It is allowed to be connected outside as well. The components composing a packet assembly/disassembly, packet sending and packet receiving unit for sending a response monitoring packet via a network from a first telecommunication equipment toward a second telecommunication equipment with which telecommunication is exchanged and for receiving a response packet from the second telecommunication equipment can be housed in one package or be an individual unit. This system can either be composed of computer software or be composed of a combination of discrete units. Thus, various modifications of the disclosed embodiments, as well as other embodiments of this invention, will be apparent to persons skilled in the art upon reference to the description of this invention. It is therefore contemplated that the appended claims will cover any such modifications or embodiments as fall within the true scope of this invention.

What is claimed is:

1. A method for managing use of a telecommunication line, comprising:

exchanging telecommunication between a first telecommunication equipment and a second telecommunication equipment, sending a response monitoring packet via a network from said first telecommunication equipment toward said second telecommunication equipment during telecommunication exchange, activating a timer in said first telecommunication equipment, receiving a response packet from said second telecommunication equipment during telecommunication exchange, calculating a response time defined as a time length from a time at which said response monitoring packet is sent and a time at which said response packet is received, comparing said response time and a threshold value defined corresponding to a specific communication class, and disconnecting the telecommunication line connecting said first telecommunication equipment and said second telecommunication equipment, in response to an excess of said response time over said threshold value defined corresponding to said specific communication class.

2. A management system for a telecommunication line, comprising:

a packet assembly/disassembly, packet sending and packet receiving unit for sending a response monitoring packet during telecommunication exchange via a network from a first telecommunication equipment toward a second telecommunication equipment, a monitoring timer in said first telecommunication equipment for monitoring a response time defined as a time length from a time at which said response monitoring packet is sent and a time at which said response packet is received, a telecommunication control unit for comparing said response time and a threshold value defined corresponding to a specific communication class and for disconnecting said telecommunication line connecting said first telecommunication equipment, in response to an excess of said response time over said threshold value defined corresponding to said specific communication class.

3. A method for managing use of a telecommunication line, comprising:

sending a call connect request requesting connection of a line connecting a first telecommunication equipment and a second telecommunication equipment, via a network from said first telecommunication equipment toward said second telecommunication equipment, receiving a message confirming acceptance of said call connect request requesting connection of the line connecting said first telecommunication equipment and said second telecommunication equipment, from said second telecommunication equipment, calculating a response time defined as a time length from a time at which said call connect request requesting connection of the line connecting said first telecommunication equipment and said second telecommunication equipment and a time at which said message confirming acceptance of said message requesting connection of the line connecting said first telecommunication equipment and said second telecommunication equipment, is received from said second telecommunication equipment, comparing said response time and a threshold value defined corresponding to a specific communication class, and performing call management to forbear connection of said line connecting said first telecommunication equipment and said second telecommunication equipment, in response to an excess of said response time over said threshold value defined corresponding to said specific communication class and otherwise connection said line, wherein said call management is performed at call set-up.

4. A management system for a telecommunication line, comprising:

a means for sending a call connect request for requesting connection of a line connecting a first telecommunication equipment and a second telecommunication equipment, via a network from said first telecommunication equipment toward said second telecommunication equipment and for receiving a message confirming acceptance of said call connect request for requesting connection of said line connecting said first telecommunication equipment and said second telecommunication equipment, from said second telecommunication equipment, a monitoring timer for monitoring a response time defined as a time length from a time at which said call connect request requesting connection of said line connecting said first telecommunication equipment and said second telecommunication equipment at a time at which said message confirming acceptance of said call connect request requesting connection of said line connecting said first telecommunication equipment and said second telecommunication equipment, and a telecommunication control unit for comparing the response time and a threshold value to be determined corresponding to a specific communication class and for performing call management to forbear connection of said line connecting said first telecommunication equipment and said second telecommunication equipment, in response to an excess of said response time over said threshold value to be determined corresponding to said specific communication class and for otherwise connecting said line, wherein said call management is performed at call set-up.

5. The method of claim 1, wherein said threshold value for said communication class is set in advance.

6. The system of claim 2, wherein said threshold value for said communication class is set in advance.

7. The method of claim 3, wherein said threshold value for said communication class is set in advance.

8. The system of claim 4, said threshold value for said communication class is set in advance.

9. A method for controlling connection of a line between a first communication device and a second communication device, the method comprising:

exchanging telecommunication between said first communication device and said second communication device;

sending a response monitoring packet from said first communication device to said second communication device;

starting a timer in said first communication device;

selecting a threshold time for a communication class of said telecommunication;

stopping said timer when said threshold time is reached or when a response packet is received from said second communication device;

if said threshold time is reached, disconnecting the line between said first communication device and said second communication device; and if said timer is stopped before said threshold time is reached, maintaining connection of said line between said first communication device and said second communication device.

10. The method of claim 9, wherein said response monitoring packet is sent out at regular intervals.

11. The method of claim 9, wherein a message is sent to said second communication device to disconnect said line.

12. The method of claim 9, further comprising disconnecting said line as soon as said threshold time is reached.

13. The method of claim 9, wherein said response monitoring packet and said response packet are sent during telecommunication.

14. The method of claim 9, wherein threshold times are selected in advance for said communication classes.

15. The method of claim 9, wherein said timer is started when said response monitoring packet is sent.

16. A method for controlling connection of a line between a first communication device and a second communication device, the method comprising:

sending a set-up message from said first communication device to said second communication device;

starting a timer in said first communication device;

selecting a threshold time;

stopping said timer when said threshold time is reached or when a confirmation message is received at said first communication device from said second communication device;

if said threshold time is reached, forbearing connection of a line between said first communication device and said second communication device; and if said timer is stopped before said threshold time is reached, connecting said line between said first communication device and said second communication device.

17. The method of claim 16, further comprising:
   sending a call connection message requesting connection of a first terminal to a second terminal from said first terminal to said first communication device; and
   sending said set-up message in response to receipt of said call connection message.

18. The method of claim 17, wherein a message refusing connection of said line is sent to said first terminal.

19. The method of claim 18, further comprising sending said message refusing connection of said line as soon as said threshold is reached.

20. The method of claim 16, wherein said threshold time is selected in advance based on different communication classes.

* * * * *